United States Patent
Gonzalez et al.

(10) Patent No.: US 12,264,700 B2
(45) Date of Patent: Apr. 1, 2025

(54) PUSH-ON RETAINER(S) FOR AN AIRCRAFT WALL STRUCTURE

(71) Applicant: Rohr, Inc., Chula Vista, CA (US)

(72) Inventors: Rosa Gonzalez, Santa Ana, CA (US); Aleksandar Ratajac, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 336 days.

(21) Appl. No.: 17/713,773

(22) Filed: Apr. 5, 2022

(65) Prior Publication Data
US 2023/0312079 A1  Oct. 5, 2023

(51) Int. Cl.
*F16B 5/01* (2006.01)
*B64C 1/40* (2006.01)

(52) U.S. Cl.
CPC .............. *F16B 5/01* (2013.01); *B64C 1/403* (2013.01)

(58) Field of Classification Search
CPC ...................................... B64C 1/403
See application file for complete search history.

(56) References Cited

U.S. PATENT DOCUMENTS

| | | | | |
|---|---|---|---|---|
| 3,213,507 A * | 10/1965 | Christian | ............... | F16B 5/065 24/682.1 |
| 3,668,966 A * | 6/1972 | Kincaid | ................... | F16B 5/01 29/523 |
| 4,778,702 A * | 10/1988 | Hutter, III | ........... | B29C 65/7855 156/247 |
| 4,842,912 A * | 6/1989 | Hutter, III | ............... | B29C 65/48 156/763 |
| 4,919,366 A * | 4/1990 | Cormier | ................... | B64C 1/38 220/592.21 |
| 4,984,947 A * | 1/1991 | Flauraud | ................ | F16B 19/00 411/339 |
| 5,795,118 A | 8/1998 | Osada | | |
| 6,299,106 B1 | 10/2001 | Shorey | | |
| 7,584,582 B1 * | 9/2009 | Hutter, III | ................ | B64C 1/40 52/407.4 |
| 8,056,862 B1 | 11/2011 | Tomerlin | | |
| 8,388,295 B2 * | 3/2013 | Kamiya | ................ | F16B 5/0628 411/383 |

(Continued)

FOREIGN PATENT DOCUMENTS

JP  2020085203 A  6/2020

OTHER PUBLICATIONS

EP Search Report for EP Application No. 23166838.5 dated Aug. 8, 2023.

*Primary Examiner* — Matthew R McMahon
(74) *Attorney, Agent, or Firm* — Getz Balich LLC (57) ABSTRACT

A wall structure is provided for an aircraft. This wall structure includes a first wall section, a second wall section and a fastener system fastening the second wall section to the first wall section. The second wall section includes an aperture extending axially along an axis through the second wall section. The second wall section is axially spaced from the first wall section. The fastener system includes a mount and a retainer. The mount is connected to the first wall section. The mount includes a post that projects axially into the aperture. The retainer includes a head and a spring clip connected to the head. The head axially engages the second wall section. The spring clip is disposed in the aperture and is mated with the post.

17 Claims, 6 Drawing Sheets

(56) References Cited

U.S. PATENT DOCUMENTS

| | | | |
|---|---|---|---|
| 8,931,993 B2 | 1/2015 | Komsitsky | |
| 9,470,257 B2 | 10/2016 | Balderrama | |
| 9,920,784 B2* | 3/2018 | Karl | F16B 39/284 |
| 10,006,479 B2* | 6/2018 | Dickinson | F16B 21/076 |
| 10,457,377 B2* | 10/2019 | Nguyen | F16B 19/086 |
| 10,814,954 B2 | 10/2020 | Zaman | |
| 2009/0226663 A1 | 9/2009 | Hutter, III | |
| 2009/0238660 A1 | 9/2009 | Homner | |
| 2020/0149565 A1* | 5/2020 | Vorderwisch | F16B 5/065 |
| 2021/0317859 A1* | 10/2021 | Wang | A45C 13/26 |
| 2022/0325739 A1* | 10/2022 | Wang | F16B 19/1081 |

* cited by examiner

PUSH-ON RETAINER(S) FOR AN AIRCRAFT WALL STRUCTURE

BACKGROUND

1. Technical Field

This disclosure relates generally to an aircraft and, more particularly, to retainers for a wall structure of the aircraft.

2. Background Information

A wall structure for an aircraft propulsion system nacelle may include a bond panel and a thermal blanket lining the bond panel. The thermal blanket may be attached to the bond panel with threaded stud assemblies. While such attachments have various benefits, there is still room in the art for improvement.

SUMMARY OF THE DISCLOSURE

According to an aspect of the present disclosure, a wall structure is provided for an aircraft. This wall structure includes a first wall section, a second wall section and a fastener system fastening the second wall section to the first wall section. The second wall section includes an aperture extending axially along an axis through the second wall section. The second wall section is axially spaced from the first wall section. The fastener system includes a mount and a retainer. The mount is connected to the first wall section. The mount includes a post that projects axially into the aperture. The retainer includes a head and a spring clip connected to the head. The head axially engages the second wall section. The spring clip is disposed in the aperture and is mated with the post.

According to another aspect of the present disclosure, another wall structure is provided for an aircraft. This wall structure includes a first wall section, a second wall section and a fastener system fastening the second wall section to the first wall section. The second wall section overlaps the first wall section. An aperture extends axially along an axis through the second wall section. The fastener system includes a retainer and a mount. The retainer includes a head, a receiver and a plurality of spring elements connected to the head. The receiver projects axially out from the head into the aperture. The spring elements are arranged circumferentially about the receiver. The spring elements axially bias the second wall section towards the first wall section. The mount is connected to the first wall section. The mount projects axially into a receptacle in the receiver.

According to still another aspect of the present disclosure, another wall structure is provided for an aircraft. This wall structure includes a nacelle panel, a thermal blanket and a fastener system fastening the thermal blanket to the nacelle panel. The thermal blanket covers the nacelle panel. An aperture extends axially along an axis through the thermal blanket. The fastener system includes a mount and a retainer. The retainer is configured to clip onto the mount within the aperture. The thermal blanket is retained and clamped axially between the mount and the retainer.

The mount may be configured as or otherwise includes a post that projects axially into the receptacle. The receiver may be configured as or otherwise includes a spring clip. The spring clip may be disposed in the aperture and project radially into a groove in the post.

The spring clip may be biased radially against the post.

The post may include a groove. The spring clip may include a ridge that projects radially into the groove.

The spring clip may be one of a plurality of spring clips mated with the post. The spring clips may be arranged circumferentially about the axis forming a receptacle in the retainer. The post may project axially into the receptacle.

The second wall section may be retained axially between the mount and the retainer.

The wall structure may also include a grommet extending axially through the aperture between a first side and a second side. The mount may axially contact the grommet at the first side. The retainer may axially contact the grommet at the second side.

The mount may also include a spacer axially spacing the second wall section from the first wall section.

The post may project axially out from the spacer into the aperture.

The mount may also include a base and a plurality of standoffs connected to the base. The standoffs may be arranged circumferentially about the post and may axially engage the second wall section.

The mount may also include a rim bonded to the first wall section.

An air gap may be formed axially between the mount and the first wall section.

An air gap may be formed axially between the mount and the second wall section.

The retainer may also include a spring element. The head may axially engage the second wall section through the spring element.

The retainer may also include a plurality of spring elements arranged circumferentially about the axis. The spring elements may axially bias the head away from the second wall section.

The first wall section may be configured as or otherwise include a panel. The second wall section may be configured as or otherwise include a liner covering the panel.

The panel may include a first skin, a second skin and a cellular core between and connected to the first skin and the second skin.

The liner may be configured as or otherwise include a thermal blanket.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
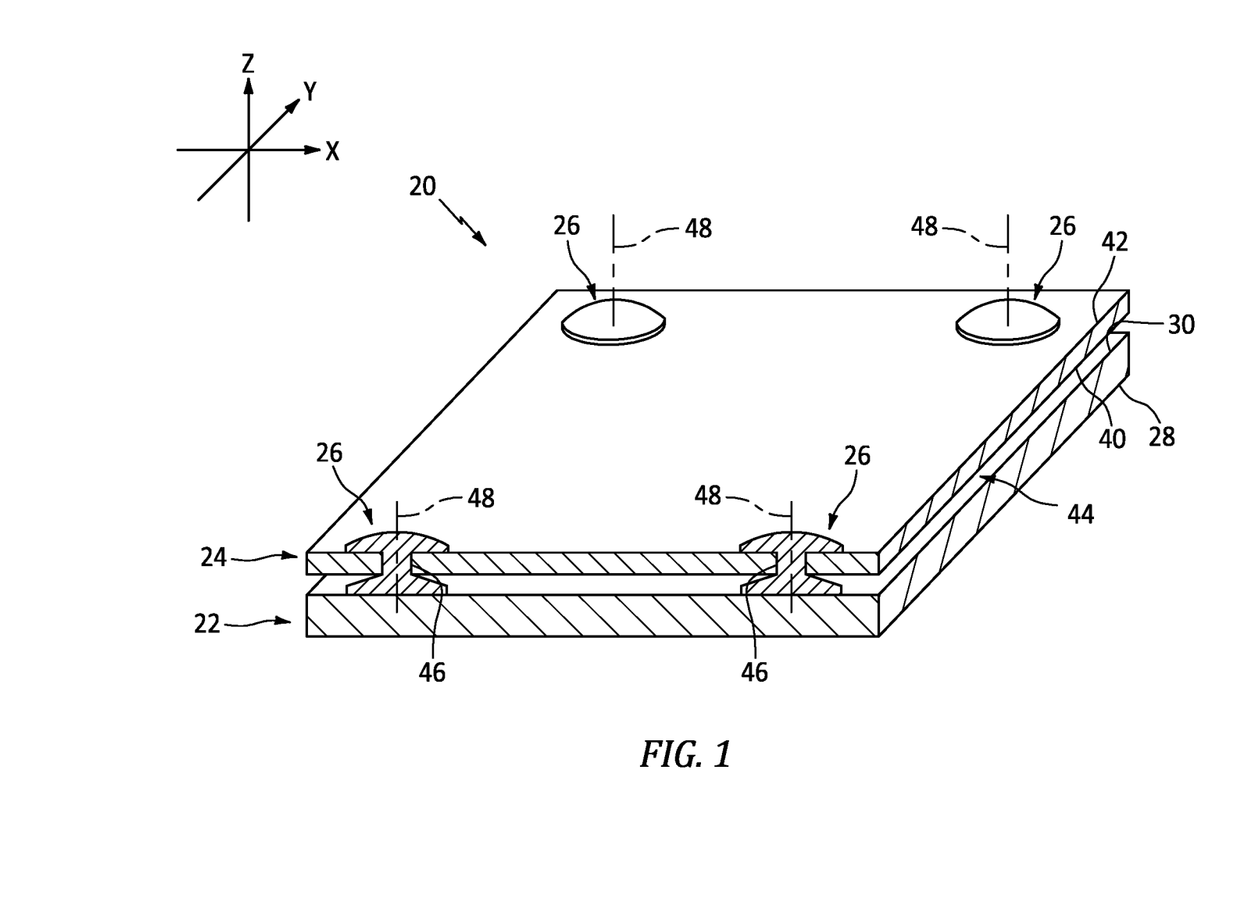
FIG. 1 is a perspective schematic illustration of a portion of a wall structure.

FIG. 1 illustrates a wall structure 20 for an aircraft. This wall structure 20 may be configured as part of a propulsion system for the aircraft. The wall structure 20, for example, may be part of an inner fixed structure (IFS) surrounding a core of a gas turbine engine; e.g., an IFS outer barrel, an IFS bifurcation wall, etc. The wall structure 20 may alternatively be configured as part of a fuselage for the aircraft. The present disclosure, however, is not limited to the foregoing exemplary wall structure types and/or configurations. The wall structure 20, for example, may be configured as or otherwise included as part of any structure for the aircraft with multiple wall sections secured together with one or more fastener systems; e.g., retention systems.

The wall structure 20 extends laterally in a first lateral direction (e.g., an x-axis direction) along an x-axis. The wall structure 20 extends laterally in a second lateral direction (e.g., a y-axis direction) along a y-axis. The wall structure 20 extends vertically in a vertical direction (e.g., a z-axis direction) along a z-axis. Note, the term "lateral" may be used herein to generally describe the first lateral direction, the second lateral direction and/or any other direction within the x-y plane. Also note, the term "vertical" may be used herein to describe a depthwise direction and is not limited to a gravitational up/down direction. Furthermore, for ease of illustration, the x-y plane is shown as a generally flat plane. However, in other embodiments, the x-y plane and, thus, the wall structure 20 may be curved and/or follow an undulating geometry. For example, the x-y plane and, thus, the wall structure 20 may be arcuate, cylindrical, conical, frustoconical, or tapered with or without radial undulations. In such embodiments, a solely vertical direction (e.g., z-axis direction) is defined relative to a position of interest on the x-y plane. For example, on a spherical x-y plane, the vertical direction (e.g., z-axis) direction is a radial direction.

The wall structure 20 of includes a first (e.g., outer, exterior) wall section 22 and a second (e.g., inner, interior) wall section 24 laterally (e.g., partially or completely) overlapping and vertically spaced from the first wall section 22. The wall structure 20 also includes one or more fastener systems 26 (e.g., retention systems) for retaining, securing and/or otherwise fastening the second wall section 24 to the first wall section 22.

The first wall section 22 extends laterally along the x-y plane. The first wall section 22 has a vertical thickness along the z-axis. This first wall section vertical thickness and, thus, the first wall section 22 extend vertically between and to a first side 28 of the first wall section 22 and a second side 30 of the first wall section 22.

Figure 2:
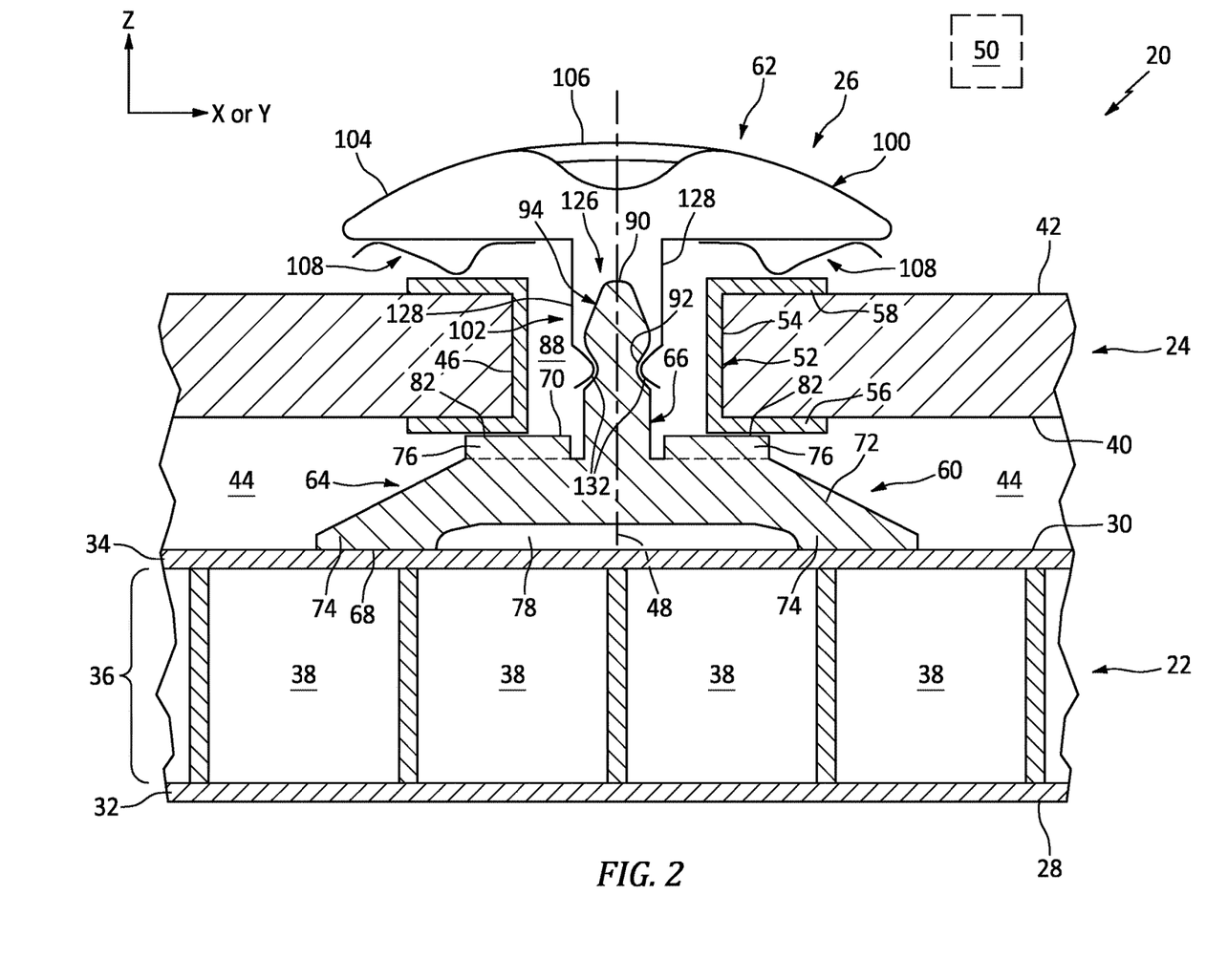
FIG. 2 is a side sectional illustration of a portion of the wall structure adjacent a heat source (schematically shown).

Referring to FIG. 2, the first wall section 22 may be configured as a wall panel; e.g., a structured wall panel such as a bond panel. The first wall section 22 of FIG. 2, for example, includes a first skin 32, a second skin 34 and a cellular core 36 (e.g., a honeycomb core) between and connected (e.g., bonded) to the first skin 32 and the second skin 34. The cellular core 36 includes a plurality of internal cavities 38, where each cavity 38 extends vertically between and to the first skin 32 and the second skin 34. The first skin 32 is arranged at and forms the first wall section first side 28. The second skin 34 is arranged at and forms the first wall section second side 30. The first skin 32 and the second skin 34 may each be configured as a solid (e.g., non-perforated) skin. Alternatively, the first skin 32 may be configured as a perforated skin with one or more perforations (e.g., through-holes), where at least some of the cavities 38 may each be fluidly coupled with one or more respective perforations to provide the first wall section 22 with a plurality of sound attenuation chambers. The first wall section 22 of the present disclosure, however, is not limited to such an exemplary configuration. For example, various other types and configurations of cellular cores are known in the art, and the present disclosure is not limited to any particular ones thereof.

The second wall section 24 extends laterally along the x-y plane (see FIG. 1). The second wall section 24 has a vertical thickness along the z-axis. This second wall section vertical thickness and, thus, the second wall section 24 extend vertically between and to a first side 40 of the second wall section 24 and a second side 42 of the second wall section 24. The second wall section first side 40 laterally overlaps and vertically faces the first wall section second side 30. The second wall section 24 and its first side 40 are vertically spaced (e.g., physically separated) from the first wall section 22 and its second side 30 by an air plenum 44; e.g., a gap, a channel, etc.

The second wall section 24 includes one or more apertures 46 (see also FIG. 1); e.g., through-holes. Each aperture 46 extends axially along a respective axis 48 (e.g., vertically along the z-axis) through the second wall section 24 between and to the second wall section first side 40 and the second wall section second side 42. Each aperture 46 may have a circular cross-sectional geometry when viewed, for example, in a first reference plane perpendicular to the respective axis 48/ a plane parallel with the lateral x-y plane. The present disclosure, however, is not limited to any particular aperture cross-sectional geometries.

The second wall section 24 may be configured as a liner for the first wall section 22. The second wall section 24, for example, may be configured as a flexible or rigid thermal barrier for the first wall section 22; e.g., a thermal blanket and/or a heat shield. The second wall section 24 may thereby provide a thermal break between the first wall section 22 and a heat source 50 such as, for example, the engine core. The second wall section 24 of the present disclosure, however, is not limited to such an exemplary configuration.

The second wall section 24 may be configured with one or more grommets 52. Each grommet 52 is mated with a respective one of the apertures 46. Each grommet 52 of FIG. 2, for example, includes a tubular base 54 and one or more annular rims 56 and 58; e.g., flanges. The grommet base 54 extends axially along the respective axis 48 through the aperture 46 between and to the grommet rims 56 and 58. The first grommet rim 56 is disposed at a first end of the respective grommet 52, and projects radially out from the grommet base 54. This first grommet rim 56 overlaps and may axially/vertically engage (e.g., contact) a portion of the second wall section first side 40 surrounding the respective grommet 52. The second grommet rim 58 is disposed at a second end of the respective grommet 52, and projects radially out from the grommet base 54. This second grommet rim 58 overlaps and may axially/vertically engage (e.g., contact) a portion of the second wall section second side 42 surrounding the respective grommet 52. The second wall section 24 is thereby retained axially/vertically between each respective pair of grommet rims 56 and 58.

Each fastener system 26 includes a mount 60 and a retainer 62 configured to mate with (e.g., clip onto) the mount 60. The mount 60 of FIG. 2 includes an inter-wall section mount spacer 64 and a mount post 66; e.g., a stud without threads.

The spacer 64 extends axially along the respective axis 48 (e.g., vertically) between and to a first side 68 of the spacer 64 (e.g., a first side of the mount 60) and a second side 70 of the spacer 64. The spacer 64 of FIG. 2 includes a spacer base 72, at least one spacer first standoff 74 and one or more spacer second standoffs 76. The base 72 is axially between and connected to (e.g., formed integral with) the first standoff 74 and the second standoffs 76.

The first standoff 74 is arranged at the spacer first side 68. The first standoff 74, for example, projects axially along the respective axis 48 out from the base 72 to the spacer first side 68. At the spacer first side 68, the first standoff 74 is welded, brazed, adhered and/or otherwise bonded to the first wall section 22 at its second side 30. The spacer 64 and its first standoff 74 thereby axially/vertically connect the mount 60 to the first wall section 22.

Figure 3A:
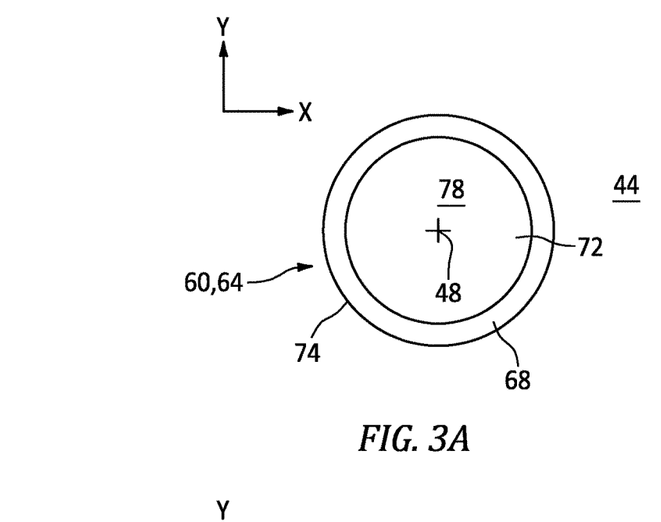
FIGS. 3A and 3B are end illustrations of a mount with various first standoff configurations.
Figure 3B:
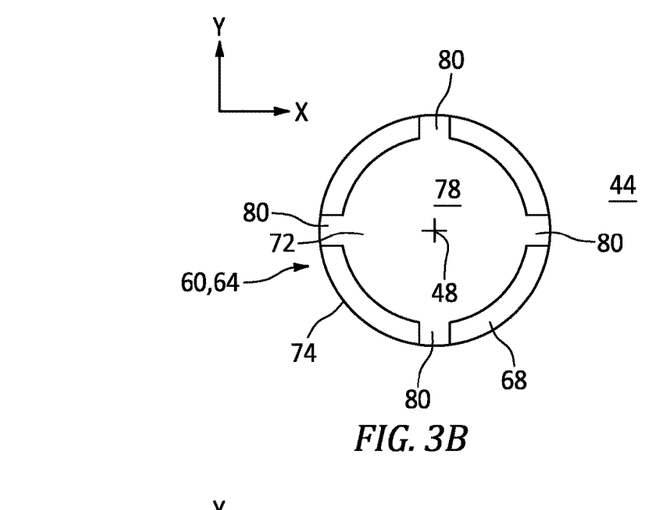

The first standoff 74 may be configured as a (e.g., annular) rim which extends circumferentially about (e.g., substantially or completely around) the respective axis 48. With this arrangement, a first air gap 78 is formed axially between and by the base 72 and the first wall section 22 and its second side 30. The first air gap 78 extends laterally (e.g., radially) within the mount 60, adjacent the first wall section 22 and the base 72, between opposing portions of the first standoff 74. Referring to FIG. 3A, this first air gap 78 may be enclosed. The first air gap 78 of FIG. 3A, for example, is fluidly decoupled from the plenum 44 by the spacer 64 and its first standoff 74. Referring to FIG. 3B, the first air gap 78 may alternatively be open. The first air gap 78 of FIG. 3B, for example, is fluidly coupled with the plenum 44 via one or more channels 80 through the spacer 64 and its first standoff 74. Referring again to FIG. 2, provision of the first standoff 74 and the first air gap 78 reduce contact area between the spacer 64 and the first wall section 22, and may thereby reduce thermal conduction between the spacer 64 and the first wall section 22.

The second standoffs 76 are arranged at the spacer second side 70. Each second standoff 76, for example, projects axially along the respective axis 48 out from the base 72 to the spacer second side 70. At the spacer second side 70, one or more or all of the second standoffs 76 axially/vertically engage the second wall section 24 at its first side 40. A distal end 82 of each second standoff 76, for example, is abutted axially against and contacts the respective first grommet rim 56. The spacer 64 is thereby axially/vertically between and spaces (e.g., separates) the first wall section 22 and the second wall section 24.

Figure 4:
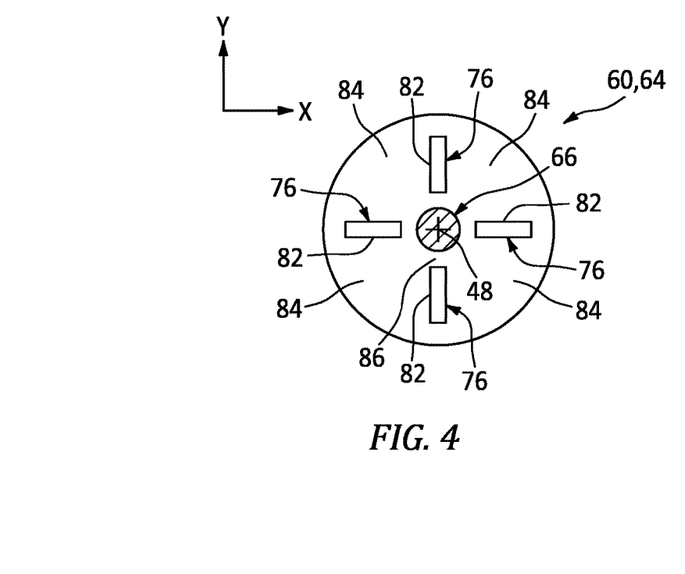
FIG. 4 is a cross-sectional illustration of the mount at a plurality of second standoffs.

Referring to FIG. 4, the second standoffs 76 are arranged circumferentially about the respective axis 48 and the post 66 in an array. Each of the second standoffs 76 is configured as a discrete protrusion such as, but not limited to, an elongated ridge or a point protrusion. Each of the second standoffs 76 may be radially spaced and outboard from the post 66. Each of the second standoffs 76 is laterally (e.g., circumferentially) spaced from laterally neighboring second standoffs 76. With this arrangement, a second air gap 84 is formed laterally (e.g., circumferentially) between each laterally neighboring pair of the second standoffs 76. These second air gaps 84 fluidly couple a (e.g., annular) central air gap 86 about the post 66 with the plenum 44. Referring again to FIG. 2, provision of the second standoffs 76 and the second air gaps 84 (see FIG. 4) reduce contact area between the spacer 64 and the second wall section 24/ the respective grommet 52, and may thereby reduce thermal conduction between the spacer 64 and the second wall section 24. Thus, the spacer 64 may spatially locate the first wall section 22 and the second wall section 24 relative to one another while providing a relatively small conductive path between the first wall section 22 and the second wall section 24/ the respective grommet 52.

The post 66 of FIG. 2 is connected to (e.g., formed integral with) the spacer 64 at (e.g., on, adjacent or proximate) the spacer second side 70. The post 66 projects axially along the respective axis 48 out from the spacer 64 and its base 72 (in a direction away from the first wall section 22) into the respective aperture 46/grommet bore 88 to a distal end 90 (e.g., a point, a tip) of the post 66. This distal end 90 may be located within the aperture 46, or outside of the aperture 46 where the post 66 extends axially into and out of (e.g., through) the aperture 46.

Figure 5:
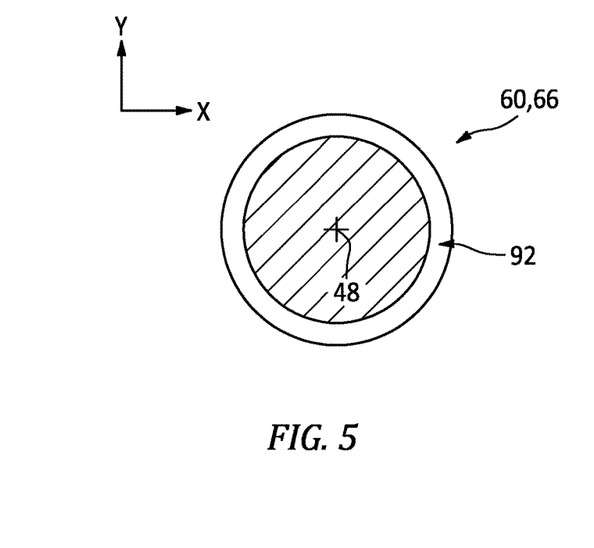
FIG. 5 is a cross-sectional illustration of a post for the mount.

The post 66 includes a (e.g., annular) groove 92 such as, for example, a notch, a recess or a channel. The groove 92 is disposed proximate the distal end 90. This groove 92 projects radially into the post 66 from an exterior of the post 66 to an end of the groove 92. The groove 92 extends axially along the respective axis 48 within the post 66 between opposing sides of the groove 92. The groove end and sides may provide the groove 92 with a curved (e.g., arcuate, splined, etc.) sectional geometry when viewed, for example, in a second reference plane parallel with and/or coincident with the respective axis 48. Referring to FIG. 5, the groove 92 extends within the post 66 circumferentially about (e.g., completely around) the respective axis 48.

The post 66 may have a circular cross-sectional geometry when viewed, for example, in the first reference plane. The present disclosure, however, is not limited to any particular post cross-sectional geometries. Referring again to FIG. 2, an end portion 94 of the post 66 may radially taper as the post 66 extends axially from the groove 92 to the distal end 90.

Figure 6:
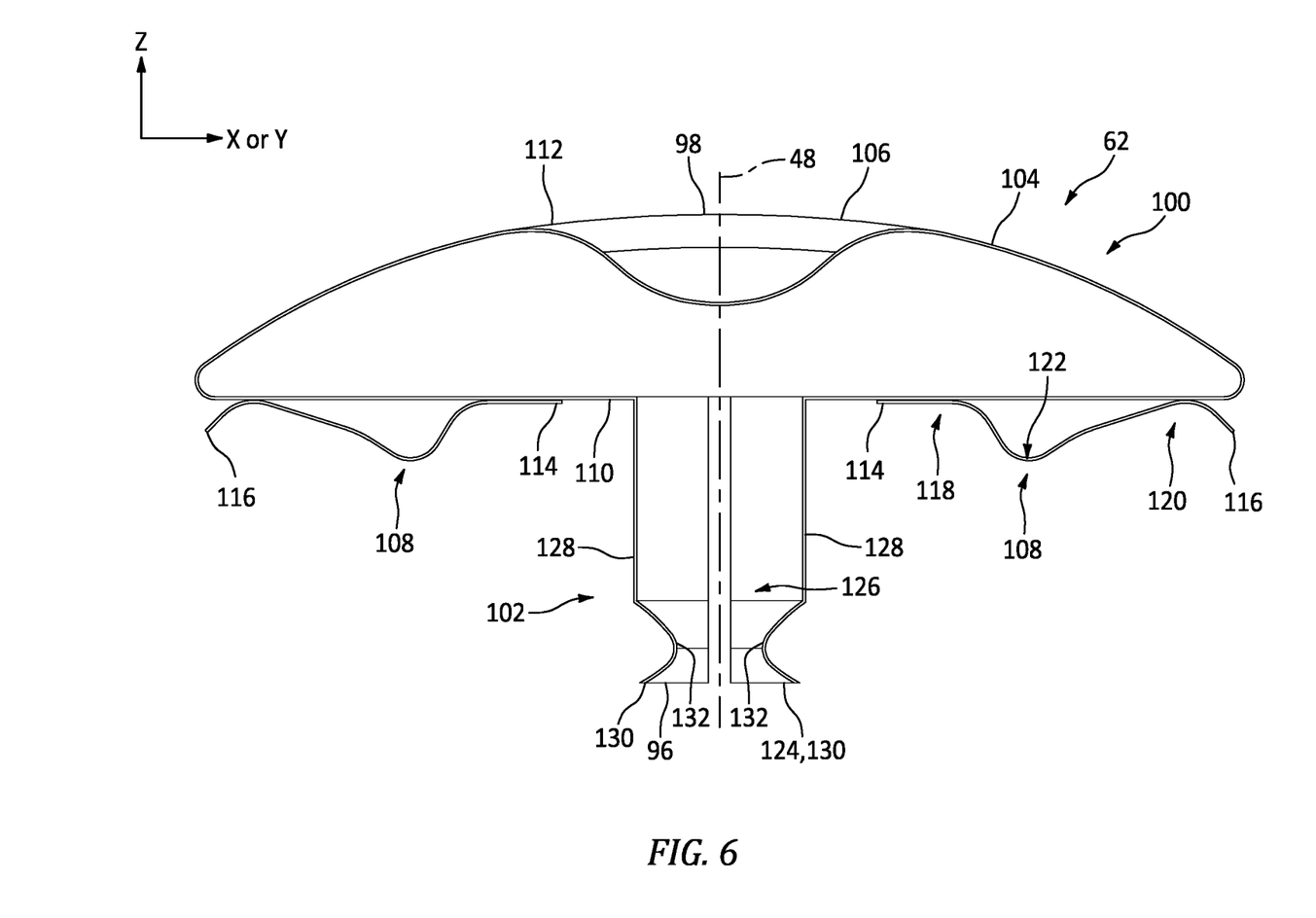
FIG. 6 is a side sectional illustration of a retainer.

Referring to FIG. 6, the retainer 62 extends axially along the respective axis 48 between and to a first end 96 of the retainer 62 and a second end 98 of the retainer 62. The retainer 62 includes a retainer head assembly 100 at the retainer second end 98, and a retainer receiver 102 at the retainer first end 96. The head assembly 100 includes a retainer head 104, a retainer grip 106 and one or more retainer spring elements 108.

Figure 7:
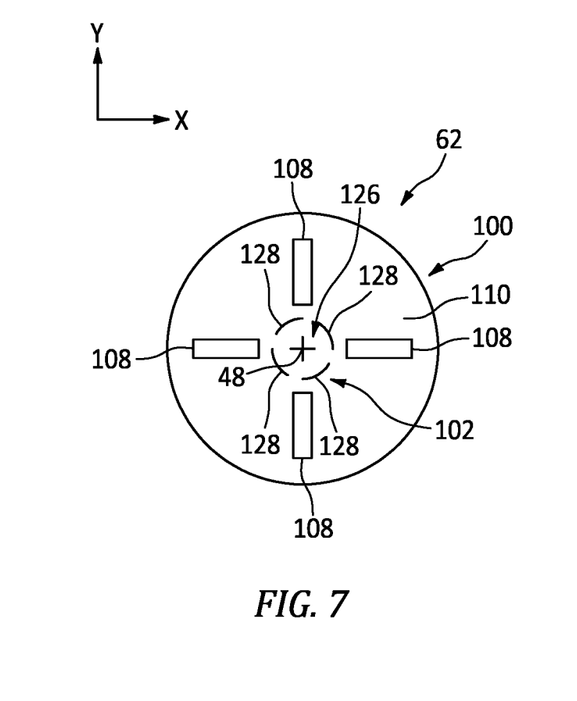
FIG. 7 is a cross-sectional illustration of the retainer at a plurality of spring elements.

The retainer head 104 extends axially between and to a first side 110 of the retainer head 104 and a second side 112 of the retainer head 104, where the head second side 112 may be at the retainer second end 98. The retainer head 104 is axially/vertically between the retainer grip 106 and the spring elements 108. The retainer grip 106 of FIG. 6, for example, is connected to (e.g., formed integral with or bonded to) the retainer head 104 at the head second side 112. The retainer grip 106 is configured for mating with a tool for installation and/or removal of the retainer 62. The spring elements 108 of FIG. 6 are connected (e.g., formed integral with or attached to) the retainer head 104 at the head first side 110. Referring to FIG. 7, these spring elements 108 may be arranged circumferentially about the respective axis 48 and the receiver 102 in an array.

Figure 8:
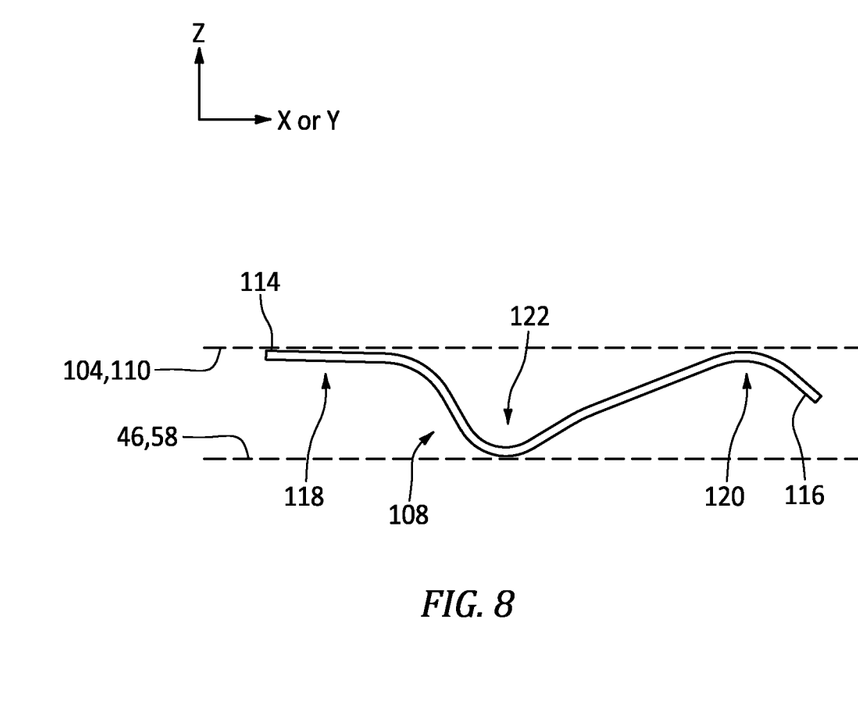
FIG. 8 is an illustration of one of the spring elements.

Referring to FIG. 8, each of the spring elements 108 may be configured as or otherwise include a leaf spring. Each spring element 108 of FIG. 8, for example, extends longitudinally between and to a radial inner end 114 and a radial outer end 116. Each spring element 108 of FIG. 8 includes an inner end portion 118 at the element inner end 114, an outer end portion 120 at the element outer end 116, and an intermediate portion 122 longitudinally between and connected to the inner end portion 118 and the outer end portion 120. The inner end portion 118 is connected to (e.g., formed integral with or bonded to) the head 104 at its first side 110.

The outer end portion 120 is axially/vertically engaged with (e.g., contacts), but is moveable (e.g., slidable) along, the head 104 at its first side 110. The intermediate portion 122 is spaced axially/vertically from the head 104 and its first side 110 by a gap. Of course, in other embodiments, the inner end portion 118 may move along the head first side 110 and the outer end portion 120 may be fixed to the head 104.

Referring to FIG. 6, the receiver 102 is connected to (e.g., formed integral with or attached to) the head assembly 100 and its head 104. The receiver 102 projects axially out from the head 104 at its first side 110 along the respective axis 48 to a distal end 124 of the receiver 102. The receiver 102 of FIG. 6 includes a receptacle 126 and one or more spring clips 128.

The receptacle 126 is configured as an internal bore within the receiver 102 formed at least partially by the spring clips 128. The receptacle 126 of FIG. 6, for example, projects axially along the respective axis 48 into the retainer 62 and its receiver 102 from the distal end 124. The receptacle 126 extends laterally (e.g., radially) within the receiver 102 between opposing spring clips 128.

The spring clips 128 are configured as spring arms cantilevered from the head 104. Each spring clip 128 of FIG. 6, for example, projects axially out from the head 104 along the respective axis 48 to a distal (e.g., unsupported) end 130 of the respective spring clip 128, which distal end 130 is at the distal end 124 of the receiver 102. Each spring clip 128 is configured with a projection 132 such as a ridge. This clip projection 132 projects radially out from a base of the respective spring clip 128 inwards towards the respective axis 48. Referring to FIG. 7, the spring clips 128 are arranged circumferentially about the respective axis 48 and the receptacle 126 in an array.

Referring to FIG. 2, each retainer 62 is mated with (e.g., clipped onto) a respective one of the mounts 60. Each retainer 62, for example, may be pushed onto the respective mount 60 by hand, or via a tool mated with (e.g., clasped onto) and/or otherwise engaged with the grip 106. More particularly, each retainer 62 may be moved (e.g., translated) axially along the respective axis 48 (e.g., without rotation about the respective axis 48) such that the receiver 102 projects axially into the respective aperture 46/ the respective grommet bore 88 and mates with the respective post 66. Within the respective aperture 46/ the respective grommet bore 88, the post 66 projects into/is received by the receptacle 126. As the post 66 moves (e.g., translates) axially into the receptacle 126, one or more or all of the spring clips 128 may splay radially outward until the clip projections 132 axially align with the groove 92. The clip projections 132 may then nest with (e.g., project radially into) the groove 92. One or more or all of the spring clips 128 may also press (e.g., be spring biased) against the post 66 to, for example, maintain the clip projections 132 within the groove 92 and/or reduce or prevent relative axial movement between the receptacle 126 and the post 66.

Where the receiver 102 is mated with the post 66, the head assembly 100 and one or more or all of its spring elements 108 may axially/vertically engage the second wall section 24. Each of the spring elements 108, for example, may contact the respective second grommet rim 58. Each of the spring elements 108 may further press (e.g., be spring biased) axially/vertically against the respective grommet 52, thereby biasing the second wall section 24 axially/vertically against the respective spacer 64 and towards the first wall section 22. With this arrangement, the second wall section 24 is retained axially/vertically between the spacers 64 and the retainers 62. The second wall section 24 may also be clamped axially/vertically between the spacers 64 and the retainers 62 (e.g., via the spring bias), which may reduce or prevent relative movement between the wall sections 22 and 24.

Since each retainer 62 may be pressed onto the respective mount 60, the fastener systems 26 may be assembled with relative ease. By contrast, a traditional fastener system utilizes a threaded stud mated with a nut which may require tightening to a specific torque. This torque is selected to prevent unthreading of the nut from the stud, which also preventing or limiting damage to (e.g., crushing of) the retained wall section.

Figure 9:
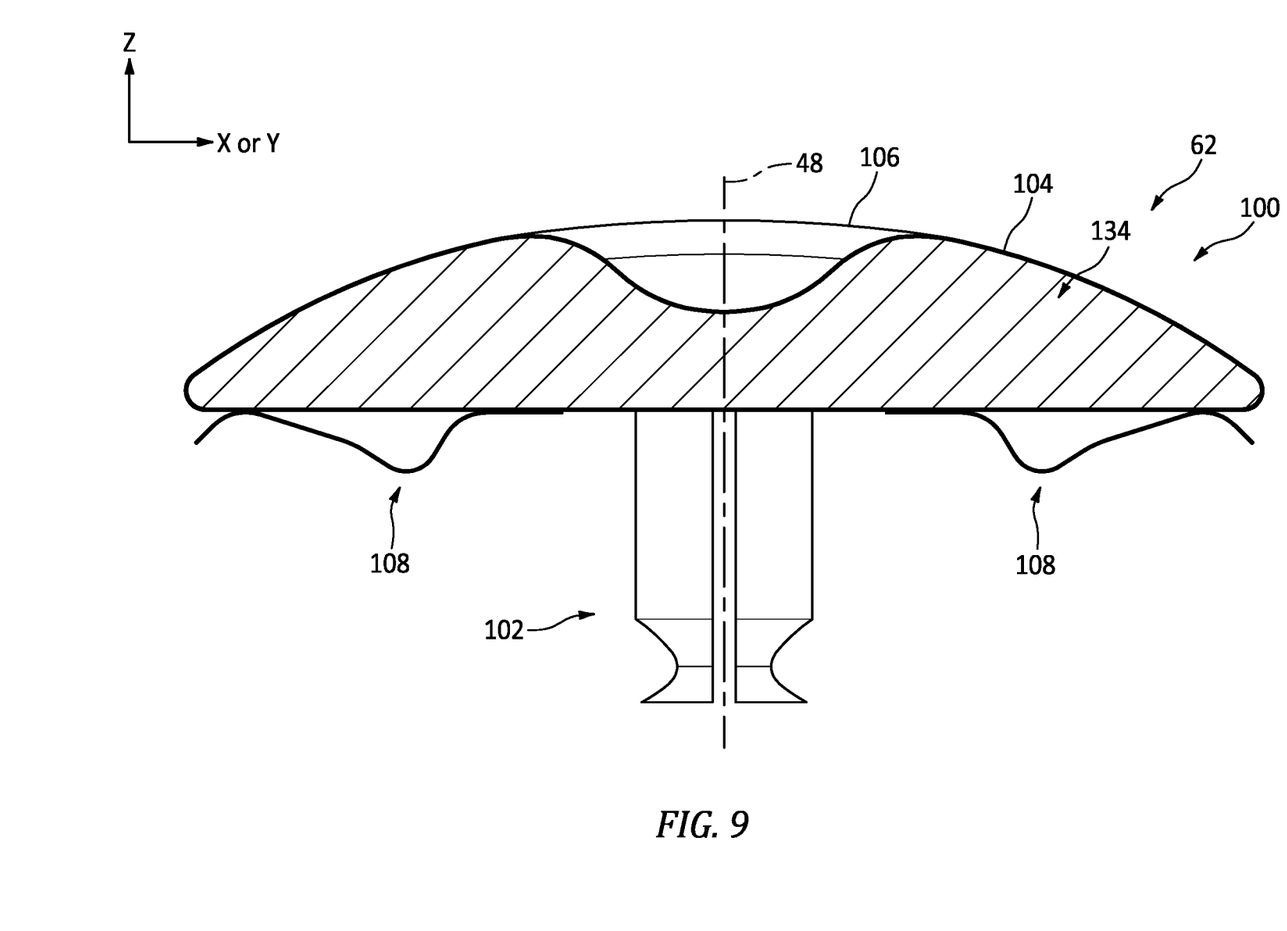
FIG. 9 is a side sectional illustration of the retainer filled with insulation material.

In some embodiments, referring to FIG. 9, the head 104 may include an internal cavity filled with insulation material 134.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A wall structure for an aircraft, comprising:
   a first wall section;
   a second wall section comprising an aperture extending axially along an axis through the second wall section, the second wall section axially spaced from the first wall section;
   a fastener system fastening the second wall section to the first wall section, the fastener system including a mount and a retainer, the mount connected to the first wall section and comprising a post that projects axially into the aperture; and
   an air gap axially between the mount and the first wall section;
   the retainer including a head and a spring clip connected to the head, the head axially engaging the second wall section, and the spring clip disposed in the aperture and mated with the post,
   wherein:
       the first wall section comprises a panel;
       the second wall section comprises a liner covering the panel; and
       the panel comprises a first skin, a second skin, and a cellular core between and connected to the first skin and the second skin; and
   wherein the air gap extends axially between the mount and the first wall section while the second wall section is completely fastened to the first wall section by the fastener system.

2. The wall structure of claim 1, wherein the spring clip is biased radially against the post.

3. The wall structure of claim 1, wherein
   the post comprises a groove; and
   the spring clip comprises a ridge that projects radially into the groove.

4. The wall structure of claim 1, wherein
   the spring clip is one of a plurality of spring clips mated with the post;
   the plurality of spring clips are arranged circumferentially about the axis forming a receptacle in the retainer; and the post projects axially into the receptacle.

5. The wall structure of claim 1, wherein the second wall section is retained axially between the mount and the retainer.

6. The wall structure of claim 1, further comprising:
a grommet extending axially through the aperture between a first side and a second side;
the mount axially contacting the grommet at the first side; and
the retainer axially contacting the grommet at the second side.

7. The wall structure of claim 1, wherein the mount further includes a spacer axially spacing the second wall section from the first wall section.

8. The wall structure of claim 7, wherein the post projects axially out from the spacer into the aperture.

9. The wall structure of claim 1, wherein
the mount further includes a base and a plurality of standoffs connected to the base; and
the plurality of standoffs are arranged circumferentially about the post and axially engage the second wall section.

10. The wall structure of claim 1, wherein the mount further includes a rim bonded to the first wall section.

11. The wall structure of claim 1, further comprising a second air gap axially between the mount and the second wall section.

12. The wall structure of claim 1, wherein
the retainer further includes a spring element; and
the head axially engages the second wall section through the spring element.

13. The wall structure of claim 1, wherein
the retainer further comprises a plurality of spring elements arranged circumferentially about the axis; and
the plurality of spring elements axially bias the head away from the second wall section.

14. The wall structure of claim 1, wherein the liner comprises a thermal blanket.

15. A wall structure for an aircraft, comprising:
a first wall section;
a second wall section overlapping the first wall section, an aperture extending axially along an axis through the second wall section;
a fastener system fastening the second wall section to the first wall section, the fastener system including a retainer and a mount; and
an air gap axially between the mount and the first wall section;
the retainer including a head, a receiver and a plurality of spring elements connected to the head, the receiver projecting axially out from the head into the aperture, the plurality of spring elements arranged circumferentially about the receiver and axially biasing the second wall section towards the first wall section; and
the mount connected to the first wall section and projecting axially into a receptacle in the receiver,
wherein:
the first wall section comprises a panel;
the second wall section comprises a liner covering the panel; and
the panel comprises a first skin, a second skin, and a cellular core between and connected to the first skin and the second skin; and
wherein the air gap extends axially between the mount and the first wall section while the second wall section is completely fastened to the first wall section by the fastener system.

16. The wall structure of claim 15, wherein
the mount comprises a post that projects axially into the receptacle; and
the receiver comprises a spring clip disposed in the aperture and projecting radially into a groove in the post.

17. A wall structure for an aircraft, comprising:
a nacelle panel;
a thermal blanket covering the nacelle panel, an aperture extending axially along an axis through the thermal blanket;
a fastener system fastening the thermal blanket to the nacelle panel, the fastener system comprising a mount and a retainer configured to clip onto the mount within the aperture, wherein the thermal blanket is retained and clamped axially between the mount and the retainer, and
an air gap axially between the mount and the nacelle panel;
wherein the air gap extends axially between the mount and the nacelle panel while the thermal blanket is completely fastened to the nacelle panel by the fastener system.

* * * * *